United States Patent
Sage et al.

(10) Patent No.: US 12,488,271 B2
(45) Date of Patent: Dec. 2, 2025

(54) PARALLEL SIDEBAND COOLING OF MULTIPLE TRAPPED-ION MOTIONAL MODES WITH DEFLECTORS

(71) Applicant: IonQ, Inc., College Park, MD (US)

(72) Inventors: Jeremy Matthew Sage, Acton, MA (US); Kai Makoto Hudek, Hyattsville, MD (US)

(73) Assignee: IonQ, Inc., College Park, MD (US)

( * ) Notice: Subject to any disclaimer, the term of this patent is extended or adjusted under 35 U.S.C. 154(b) by 423 days.

(21) Appl. No.: 18/062,404

(22) Filed: Dec. 6, 2022

(65) Prior Publication Data

US 2024/0054380 A1 Feb. 15, 2024

Related U.S. Application Data

(60) Provisional application No. 63/286,865, filed on Dec. 7, 2021.

(51) Int. Cl.
*G06N 10/40* (2022.01)

(52) U.S. Cl.
CPC .................................. *G06N 10/40* (2022.01)

(58) Field of Classification Search
CPC .............................. G06N 10/20; G06N 10/40
See application file for complete search history.

(56) References Cited

U.S. PATENT DOCUMENTS

| | | | |
|---|---|---|---|
| 2020/0005178 A1 * | 1/2020 | Amini | G06F 1/20 |
| 2020/0082291 A1 * | 3/2020 | Debnath | G02F 1/113 |
| 2021/0133616 A1 | 5/2021 | Debnath | |

OTHER PUBLICATIONS

Chen et al., "Efficient sideband cooling protocol for long trapped-ion chains", Physical Review A 102.4, 2020, p. 1-7, https://arxiv.org/abs/2002.04133.
International Search Report and Written Opinion issued for Int'l Appl. No. PCT/US2022/81078, Int'l Filing Date Dec. 7, 2022, mailed Mar. 9, 2023.
Canteri, M. et al., "Single-atom-focused laser for photon generation and qubit control", Universitat Innsbruck, Jun. 2020, 78 pages.
Extended European Search Report received for European Patent Application No. 22905327.7, mailed on Oct. 10, 2025, 8 pages.

* cited by examiner

*Primary Examiner* — David E Smith
(74) *Attorney, Agent, or Firm* — ARENTFOX SCHIFF LLP

(57) ABSTRACT

Aspects of the present disclosure relate generally to parallel sideband cooling of multiple trapped-ion motional modes with deflectors (e.g., acousto-optic deflectors or AODs) in quantum information processing (QIP) systems. A method and a system are described in which for an ion chain a first group of ions (e.g., middle section of the ion chain) and a second group of ions (e.g., outer sections of the ion chain) are identified. The method and system include performing sideband cooling by applying, to the first group of ions, a first pair of optical beams using a first pair of AODs, and applying, to the second group of ions, a second pair of optical beams using a second pair of AODs. For each AOD, an acousto-optic modulator (AOM) may be placed upstream to provide frequency modulation for matching frequency differences for correct detuning as part of the sideband cooling operation.

18 Claims, 10 Drawing Sheets

PARALLEL SIDEBAND COOLING OF MULTIPLE TRAPPED-ION MOTIONAL MODES WITH DEFLECTORS

PRIORITY

This application claims priority to and the benefit from U.S. Provisional Application No. 63/286,865, filed on Dec. 7, 2021, and titled "Parallel Sideband Cooling of Multiple Trapped-Ion Motional Modes with AODs," the contents of which are incorporated herein by reference in their entirety.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of parallel sideband cooling of multiple trapped-ion motional modes with deflectors (e.g., acousto-optic deflectors or AODs) in quantum information processing (QIP) systems. A method for sideband cooling of an ion chain is described that includes identifying a first group of ions in the ion chain and a second group of ions in the ion chain, wherein the ions in the first group of ions are different from the ions in the second group of ions. The method further includes performing sideband cooling of the ion chain by applying, to the first group of ions, a first pair of optical beams using a first pair of deflectors (e.g., AODs), and applying, to the second group of ions, a second pair of optical beams using a second pair of deflectors (e.g., AODs).

A QIP system is described configured for sideband cooling of an ion chain is described that includes an ion trap configured to hold the ion chain, ions in the ion chain being part of a first group of ions or a second group of ions, wherein the ions in the first group of ions are different from the ions in the second group of ions. The QIP system further includes a first pair of deflectors (e.g., AODs) configured to apply a first pair of optical beams to the first group of ions; and a second pair of deflectors (e.g., AODs) configured to apply a second pair of optical beams to the second group of ions.

In this disclosure, the term quantum computer may be used interchangeably with the term QIP system to mean a system or device capable of performing quantum operations and algorithms.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
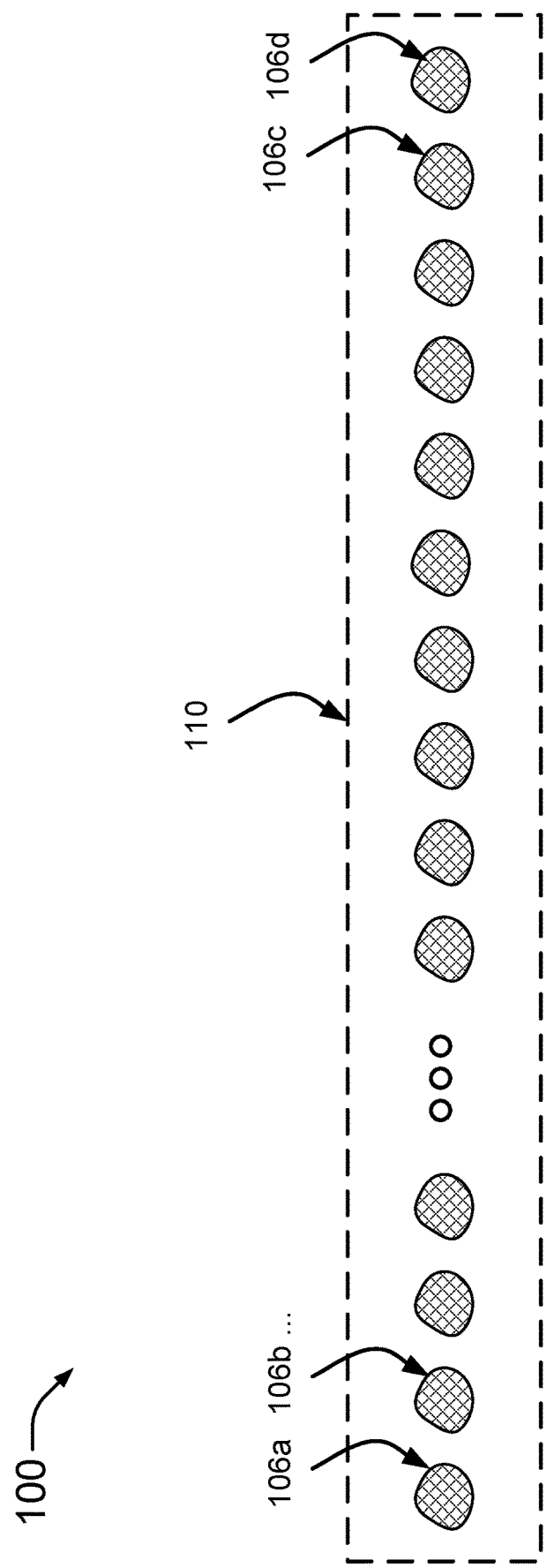
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

Optical Raman transitions are typically used as means by which trapped ions in a linear chain (see e.g., FIG. 1) are cooled to the ground states of their motional modes through a process known as sideband cooling (SBC). This is a critical step in the initialization of a trapped ion quantum computer, and the performance of this stage may directly affect the quality of the computation.

In a trapped ion chain with only a few ions, SBC can be performed in a straightforward and serial manner, where each mode of the ion chain is sequentially cooled. This technique does not rely on the details of the Raman optical beam geometry and can be performed with fewer optical beams than there are ions in the chain, for instance, with only a single pair of globally addressing optical beams.

In a longer trapped ion chain (i.e., one with many more ions in a linear arrangement), SBC is more complicated. Due primarily to the larger number of motional modes that exist in longer chains, sequential cooling can take a long time, and all ion traps have what is known as a heating rate that is essentially fighting against the cooling being performed by SBC. This heating rate will limit the performance of SBC and, if it is higher than the rate of SBC, it will cause the cooling to fail all together. Additionally, a more complicated mode structure and the specifics of the optical beam geometry and trapped ion participation in the modes can come into play in longer trapped ion chains.

Some techniques have been proposed to efficiently perform SBC of a long chain of ions using a fully connected set of Raman optical beams (e.g., one Raman optical beam for each ion) that is known as "local mode cooling." This technique relies on the fact that it is possible to have as many simultaneous Raman optical beams as there are ions in a chain, and that the frequencies of light in each optical beam can be chosen to be different. This allows one to tailor which frequency of light hits which ion to increase the impact of the optical cooling forces on the ion chain and make efficient use of the total available optical power. However, limiting the configuration of the trapped ion quantum computer to a fully connected set of Raman optical beams because of the benefits it provides to SBC can have an impact into other, and arguably important, functions of the quantum computer, such as high-fidelity gates. Thus, while this technique can be very efficient, it may raise other concerns in the overall performance of the system.

The present disclosure proposes the use of a technique that combines the use of acousto-optic modulators (AOMs) and deflectors (e.g., AODs) that provide the ability to do efficient parallel mode sideband cooling on a long ion chain without the downsides of having a fully connected set of Raman optical beams.

Solutions to the issues described above are explained in more detail in connection with FIGS. 1-7B, with FIGS. 1-3 providing a background of QIP systems or quantum computers, and more specifically, of atomic-based QIP systems or quantum computers.

Figure 2:
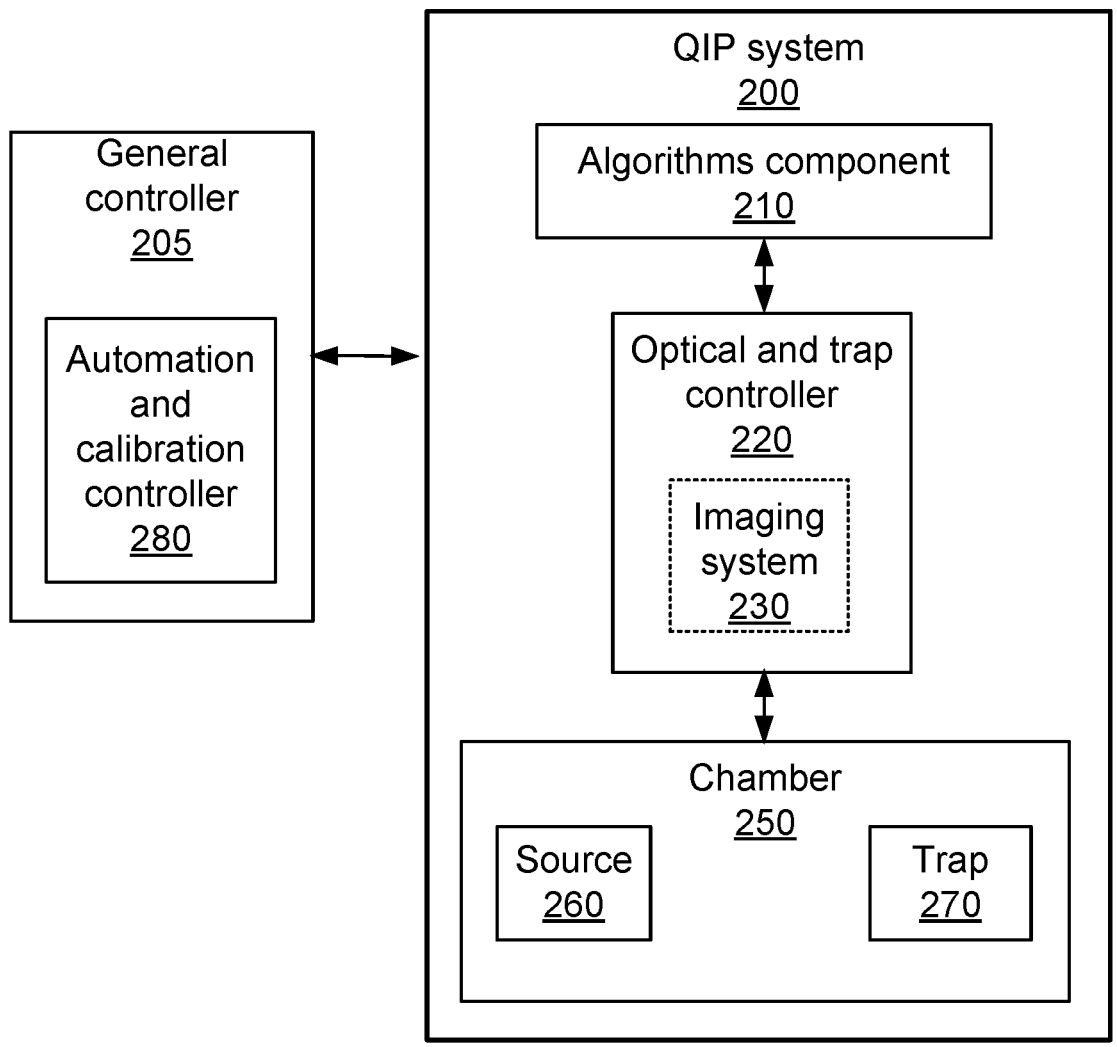
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system. Moreover, a quantum processor, sometimes referred simply as a processor, may indicate a portion of the quantum computer or QIP system that includes the chain 110 and uses the ions 106 in the chain 110 to perform quantum operations.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be ytterbium ions (e.g., $^{171}$Yb$^+$ ions), for example. The ions are illuminated with laser (optical) radiation tuned to a resonance in $^{171}$Yb$^+$ and the fluorescence of the ions is imaged onto a camera or some other type of detection device (e.g., photomultiplier tube or PMT). In this example, ions may be separated by a few microns (m) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using optical components in the QIP system 200, including those that are part of and controlled by the optical and trap controller 220, the imaging system 230 and/or the chamber 250.

Figure 3:
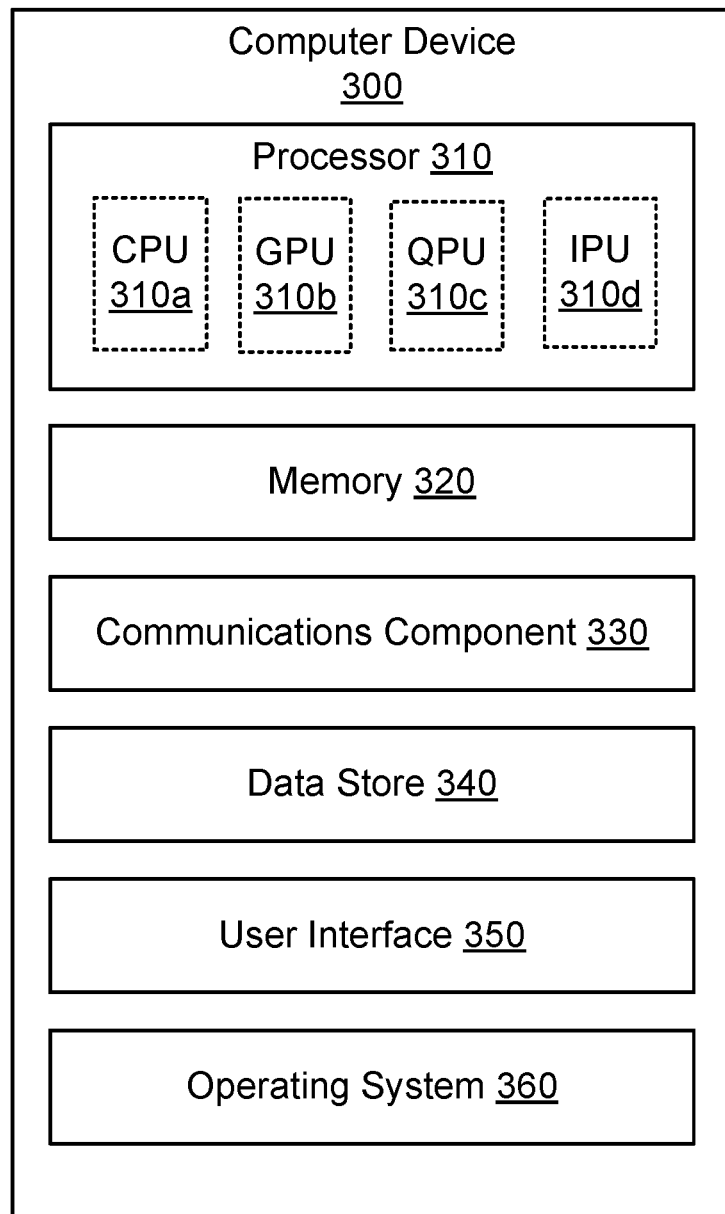
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, methods and systems for parallel sideband cooling of multiple trapped-ion motional modes with deflectors (e.g., acousto-optic deflectors or AODs) are described in more detail below.

Figure 4:
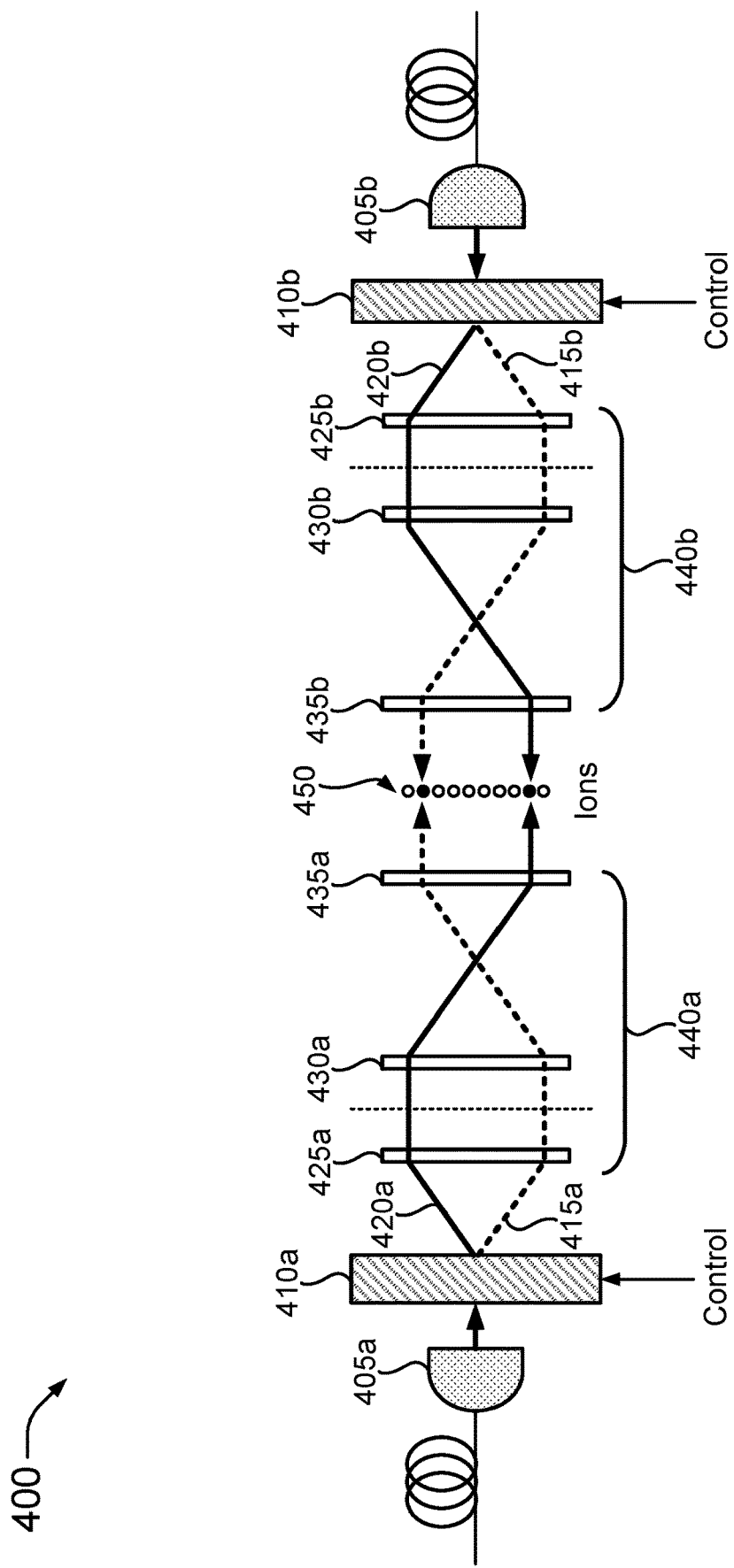
FIG. 4 illustrates an example of a counter-propagating beam scanning system in accordance with aspects of this disclosure.

FIG. 4 shows a diagram 400 that illustrates an example of a counter-propagating optical beam scanning system that uses deflectors (e.g., AODs) for optical beam steering. The general optical concept here is that with symmetrical systems in each propagation direction (double individual), the positional-dependent frequency of the AOD is canceled out, maintaining a constant Df. In this example, a pair of optical beams can be applied to different ions in an ion chain to implement single-qubit gates using the respective ion.

The diagram 400 shows a left system that includes an optical beam source 405a, a deflector 410a, a set of optical components 440a having imaging optical components 425a, 430a, and 435a. The diagram 400 also shows a right system that includes an optical beam source 405b, a deflector 410b, a set of optical components 440b having imaging optical components 425b, 430b, and 435b. The deflectors 410a and 410b may be implemented with AODs to steer optical beams (based on control signals) from the left system and from the right system onto an ion plane 450 having multiple ions (e.g., ions 106 in the chain 110). Therefore, the left system and the right system and their AODs may be used as a counter-propagating beam scanning or beam steering system, where the optical projection operation converts the frequency input into each AOD to a particular position (i.e., a particular ion position) at the ion plane 450. However, the left and right systems may have any angle between then that is not zero.

In the diagram 400, the different optical beams from an AOD represent different frequencies out of the AOD (e.g., dashed line is a lower frequency and the solid line is a higher frequency). As shown, the AODs 410a and 410b are producing a symmetric, high-frequency tone (solid line) that is projected or imaged onto the same ion at the bottom of the chain at the ion plane 450. For example, an optical beam 420a and an optical beam 420b are imaged onto the same, bottom ion in the chain from opposite directions. To address a different ion at the top of the chain at the ion plane 450, the lower frequency tone (dashed line) could be turned on. For example, an optical beam 415a and an optical beam 415b are both imaged onto the same, upper ion in the chain from opposite directions.

For ion manipulation, only the frequency difference (Df) is important. Thus, if the applied frequency of the higher frequency (or lower frequency) tone from the left system matches that from the right system the frequency difference will be zero, effectively removing the frequency dependence of the AOD with respect to beam position.

In an example, a chain of ions (see e.g., FIG. 1) having 32 ions with a spacing of 3 mm between ions may typically use an individual addressing laser waist (i.e., optical beam waist) of 1 micron (mm). To address each of the ions in the entire chain, the AOD optical beam scanning system needs at a minimum N=32 resolvable spots (one for each ion in the example) and a 93 mm field of view (FOV). The number of resolvable spots is given by the formula:

$$N = \Delta\theta/\Delta\Theta,$$

where $\Delta\theta$ is angular range of the AOD (in radians), and $\Delta\Theta$ is the Gaussian divergence of the input beam (or 1/D).

Commercially available AODs generally have an angular range of 3 degrees and an aperture exceeding 1 mm. This allows, for example, about 100 resolvable spots for a 1 mm diameter input optical beam with +/−1.5 degrees at 532 nm laser wavelength. Each resolvable spot corresponds to one of the multiple supported angles at which an AOD can steer or deflect an input optical beam. AODs may support a continuous range of angles at which they can steer or direct optical beams, thus, a particular angle from that range may be used to achieve a certain resolvable spot that coincides with the position or location of a particular ion in a chain. For comparison, MEMS with a 250 mm diameter beam and +/−6 degrees at 532 nm wavelength allows for about 100 resolvable spots. The FOV can be evaluated by calculating the effective focal length (EFL) of the optical projection system, which transforms the Gaussian waist at the AOD, here 0.5 mm, to another Gaussian waist at the ion, here 1 mm. The formula for the EFL is:

$$EFL = \pi \times w_{AOD} \times w_{ion}/\lambda,$$

which for 532 nm light results in an EFL=2.95 mm. The FOV is then:

$$FOV = EFL \times \Delta\theta,$$

which gives an FOV=2.95 mm×3 degrees=155 mm. For comparison, in the case of a MEMS system, EFL=1.48 mm and FOV=1.48 mm×12 degrees=310 mm.

The diagram 460 in FIG. 4B illustrates an example of the EFL and FOV calculations. In this example, $w_{AOD}=w_0$ and $w_{ion}=w_1$, with the input optical beam 465 to the AOD 470 having a Gaussian waist $w_0$ and optical beams 480a and 480b imaged onto ions by optical component 475 having Gaussian waists $w_1$. In this example, f is a focal length between the AOD 470 and the optical component 475, and also between the optical component 475 and the plane of ions.

AODs may also be used to overcome the power limitations of MEMS devices. The AOD in the example provided above can handle an estimated 10 W of optical power, whereas the equivalent MEMS mirror can handle an estimated 100 mW of optical power. This has implications for gate speed and thus fidelity and error, with the ability to handle higher power being preferred.

Figure 5A:
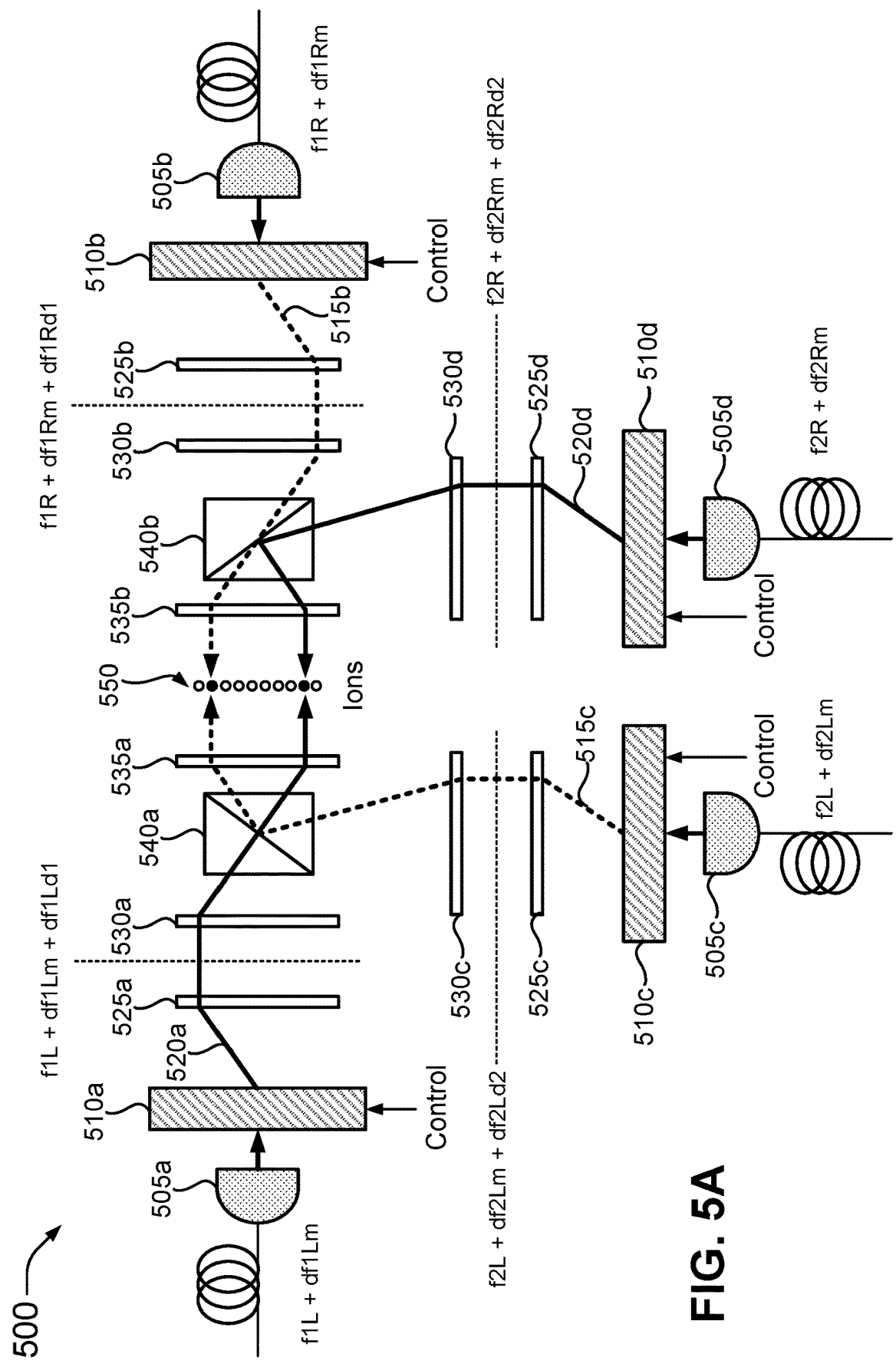
FIGS. 5A and 5B illustrate an example of a deflector-based Raman optical system in accordance with aspects of this disclosure.

FIG. 5A shows a diagram 500 that illustrates an example of a schematic of a deflector-based Raman optical system in accordance with aspects of this disclosure. In this example, four (4) deflectors (e.g., AODs) are used to generate two pairs of Raman optical beams. By having two pairs of optical beams, it is possible to implement two-qubit gates with this system.

The diagram 500 shows a first combination of AODs comprising AOD 510a and AOD 510b, and a second combination of AODs comprising AOD 510c and AOD 510d. For AOD devices, the frequency of the steered optical beam (e.g., by Bragg diffraction) is Doppler-shifted based on the frequency of the sound wave used for the deflector. The frequency into AOD 510a can be represented as f1L+df1Lm and the output frequency can be represented as f1L+df1Lm+df1Ld1. The frequency into AOD 510b can be represented as f1R+df1Rm and the output frequency can be presented as f1R+df1Rm+df1Rd1. The frequency into AOD 510c can be represented as f2L+df2Lm and the output frequency can be represented as f2L+df2Lm+df2Ld2. The frequency into AOD 510d can be represented as f2R+df2Rm and the output frequency can be represented as f2R+df2Rm+df2Rd2.

Figure 5B:
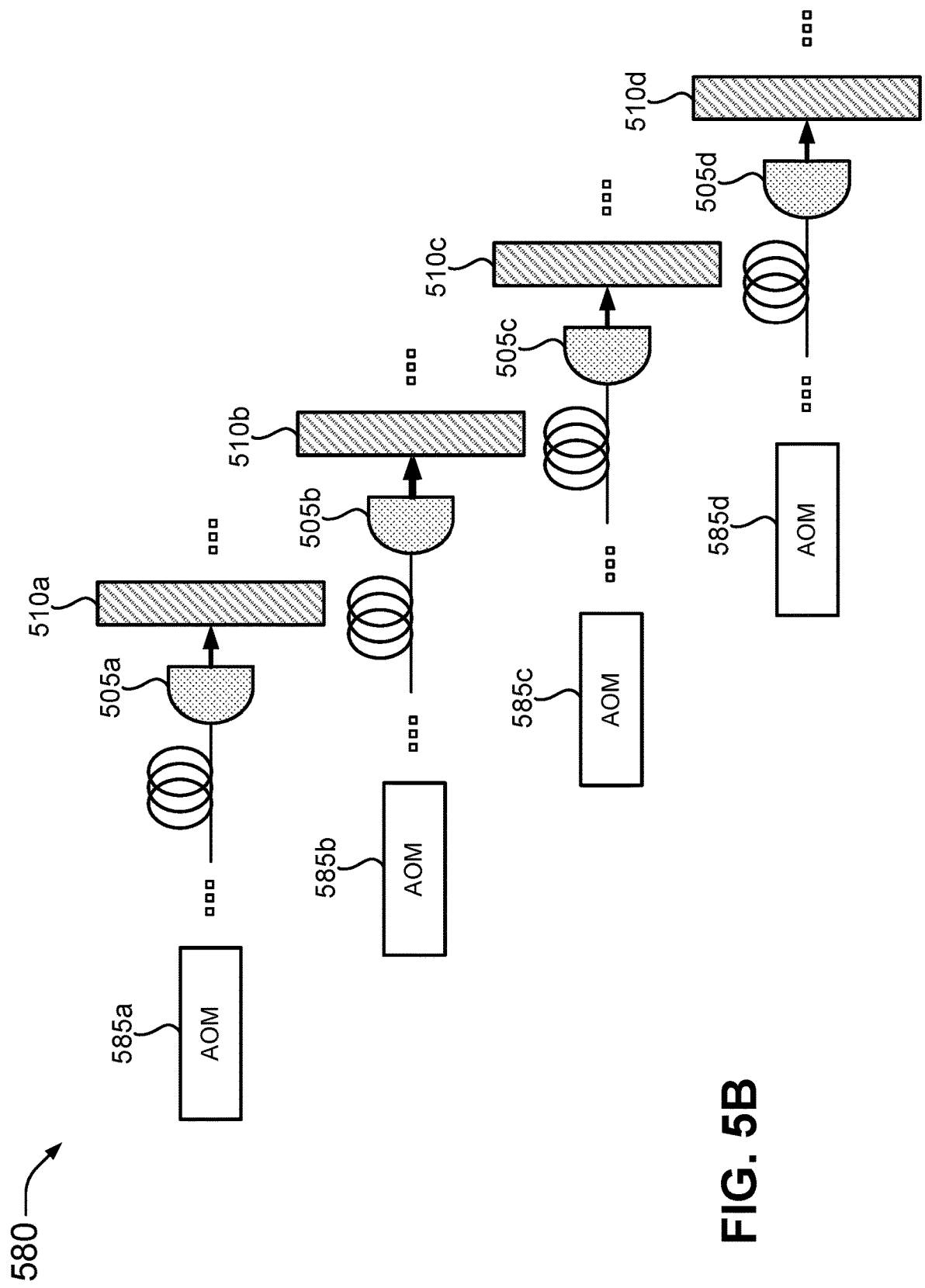
Figure 6:
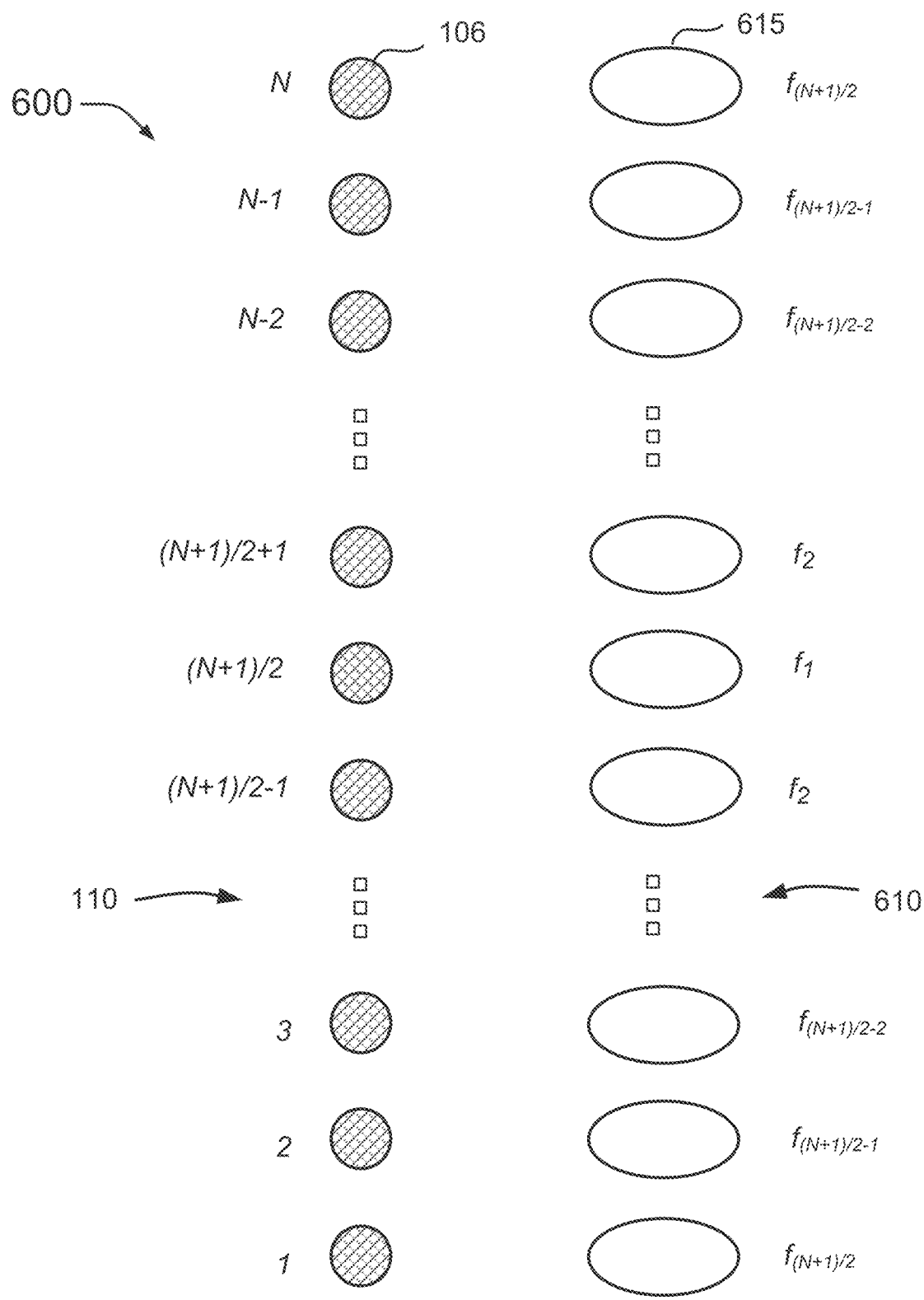
FIG. 6 illustrates an example of a technique for local mode cooling in accordance with aspects of this disclosure.

Changing the frequency sent to the AOD (e.g., df1Ld1 to AOD 510a), in the form of a control signal, results in a change in beam deflection angle, and subsequent imaging optics convert angular deflection into a beam translation along the ion chain axis. Due to the ideal symmetry of the optical configuration, and because Raman transitions depend only on the frequency difference between the two beams in a pair (e.g., between dahsed lines or between solid lines), the system can take advantage of "individual-individual" addressability (and its concomitant low-crosstalk) with low complexity in frequency shifting: e.g., df1Ld1=df1Rd1; df2Ld2=df1Rd2. Small left/right asymmetries in the optical system will require small deviations from these equalities; to make up the frequency offsets seen by the qubits; small corrections can be made via upstream modulation AOMs which shift the frequencies df1Lm, df1Rm, df2Lm, and df2Rm, recovering and modifying the above equalities to e.g., df1Ld1+df1Lm=df1Rd1+df1Rm; df2Ld2+df2Lm=df1Rd2+df2Rm. In an example, a diagram 580 in FIG. 5B shows upstreams AOMs 585a, 585b, 585c, and 585d that provide frequency modulation for AODs 510a, 510b, 510c, and 510d, respectively.

To drive two-qubit gates, multiple AODs can be combined in order to increase the number of individual manipulations of optical beams, as shown in the diagram 500. To address multiple chains, the upstream combination optics and the final projection optics can be accommodated, and the two-AODs described in connection with the diagram 400 can be replicated to provide scalability.

In the example described in the diagram 500, there is shown a left system that includes an optical beam source 505a, the deflector or AOD 510a, a set of optical components having imaging optical components 525a, 530a, 535a, and a beam splitter 540a. The diagram 500 also shows a right system that includes an optical beam source 505b, the deflector of AOD 510b, a set of optical components having imaging optical components 525b, 530b, 535b, and a beam splitter 540b. Also shown in a bottom system that includes an optical beam source 505c, the deflector or AOD 510c, a set of optical components having imaging optical components 525c and 530c and the beam splitter 540a and optical component 535a that are shared with the left system. Moreover, another bottom system that includes an optical beam source 505d, the deflector or AOD 510d, a set of optical components having imaging optical components 525d and 530d and the beam splitter 540b and optical component 535b that are shared with the right system. The AODs are configured to steer optical beams (based on control signals) from the left system, the right system, and the bottom systems onto an ion plane 550 having multiple ions (e.g., ions 106 in the chain 110). Therefore, the left system, the right system, and the bottom systems and their AODs may be used to provide counter-propagating beam scanning or beam steering system, where the optical projection operation converts the frequency input into each AOD to a particular position (i.e., a particular ion position) at the ion plane 550.

The AOD also has a unique advantage over other beam scanning systems, e.g., MEMS or EODs, in that it can drive multiple tones, and thus multiple beams at the same time, thus being able to realize parallel, or even global operations. For example, such an approach can be used to generate multiple beams by sending in multiple RF tones. Any nonlinearity will create tone mixing that can generate extra beams. It is possible to get around this with phase control over the tones or using arbitrary waveform generators (AWGs). This type of phase control could be used to implement gates and could be used for sideband cooling.

There may be other general advantages to a scanning system, which is a different modality than the fixed, imaged system that is typically used in most trapped ion quantum computers. For example, scanning systems like AOD and MEMS can address non-uniform or arbitrarily spaced ions. When a multi-channel AOM is using only 2 channels, the other channels are off (wasted power). An AOD system that has 2 channels uses 100% of the power. Moreover, the multi-channel AOM system is discrete, and aberrations could lead to ion-beam overlap error and could be a source of infidelity. An AOD system can be calibrated to remove this error.

It is to be understood that aspects of the systems described above in connection with FIGS. 4, 5A, and 5B may be implemented at least partially using the optical and trap controller 220, the imaging system 230, and/or the chamber 250 of the QIP system 200 described above in connection FIG. 2.

To initialize the trapped ion quantum computer or QIP system, ground-state cooling needs to be performed. This is typically done with sideband cooling. A local mode cooling technique is described in connection with a diagram 600 in FIG. 6. In this case, the chain 110 of N ions 106 (e.g., crosshatched circles) is addressed with a chain 610 of N Raman optical beams 615 (e.g., white elliptical cross sections of optical beams) that have (N+1)/2 different frequencies applied as shown (e.g., symmetrical about the center of the chain 610). Applying this many tones is possible because each Raman optical beam 615 in the chain 610 has its own frequency modulation (e.g., a separate channel in a multichannel AOM) that is reimaged onto the ions. As such, there is no dependence on position of the optical beam on the ions based on the frequency of the optical beam. It is to be understood that while elliptical optical beams may be used, optical beams of other shapes, such as circular optical beams, may also be used It is to be understood from the diagram 600 that the chain 610 of N Raman optical beams 615 is intended to illustrate a case where optical beams are being applied or imaged onto each of the ions 106 from two different directions and the optical beams have ideal or matching elliptical cross sections and frequencies at the respective ion (and thus appear as a single elliptical cross section).

That is not necessarily the case in an AOD-based Raman system such as the ones described above in connection with FIGS. 4, 5A, and 5B. For example, in the AOD-based Raman system shown in the diagram 500 in FIG. 5A, each of the AODs may have a single AOM upstream that can control the Raman optical beam frequency in a way that is independent of the optical beam position. In this example, there would be four (4) total AOMs upstream (see e.g., diagram 580 in FIG. 5B and AOMs 585*a*-585*d*), which is at least one AOM for each AOD. It is to be understood that more AOMs and more AODs may be added to the configuration in the diagrams 500 and 580 in FIGS. 5A and 5B, respectively, however, such additions would be at the expense of cost and complexity. In this example, however, there is a single AOM upstream for modulating each laser beam that is respectively provided to AODs 510*a*-510*d*.

A technique to circumvent this limitation in AOD-based Raman systems is described below in connection with FIGS. 7A and 7B. Here, the chain 110 of N ions 106 (e.g., crosshatched circles) is divided into two sections, the middle 50% of the ions and the outer 50% of the ions (left 25%, right 25%). It can also be said that there are three sections, left (25%), middle (50%), and right (25%) sections. The middle and outer sections are then addressed by different pairs of AODs (since there are two pairs or four AODs) in the AOD-based Raman system in the diagram 500 in FIG. 5A. For example, one pair of AODs generates the white elliptical optical beam cross sections of the outer ions (e.g., 25% of ions on the left and 25% of ions on the right) and another pair of AODs generates the diagonally hatched elliptical optical beam cross sections of the middle ions (e.g., 50% of ions in the middle), as shown in the diagram 700 in FIG. 7A.

Figure 7A:
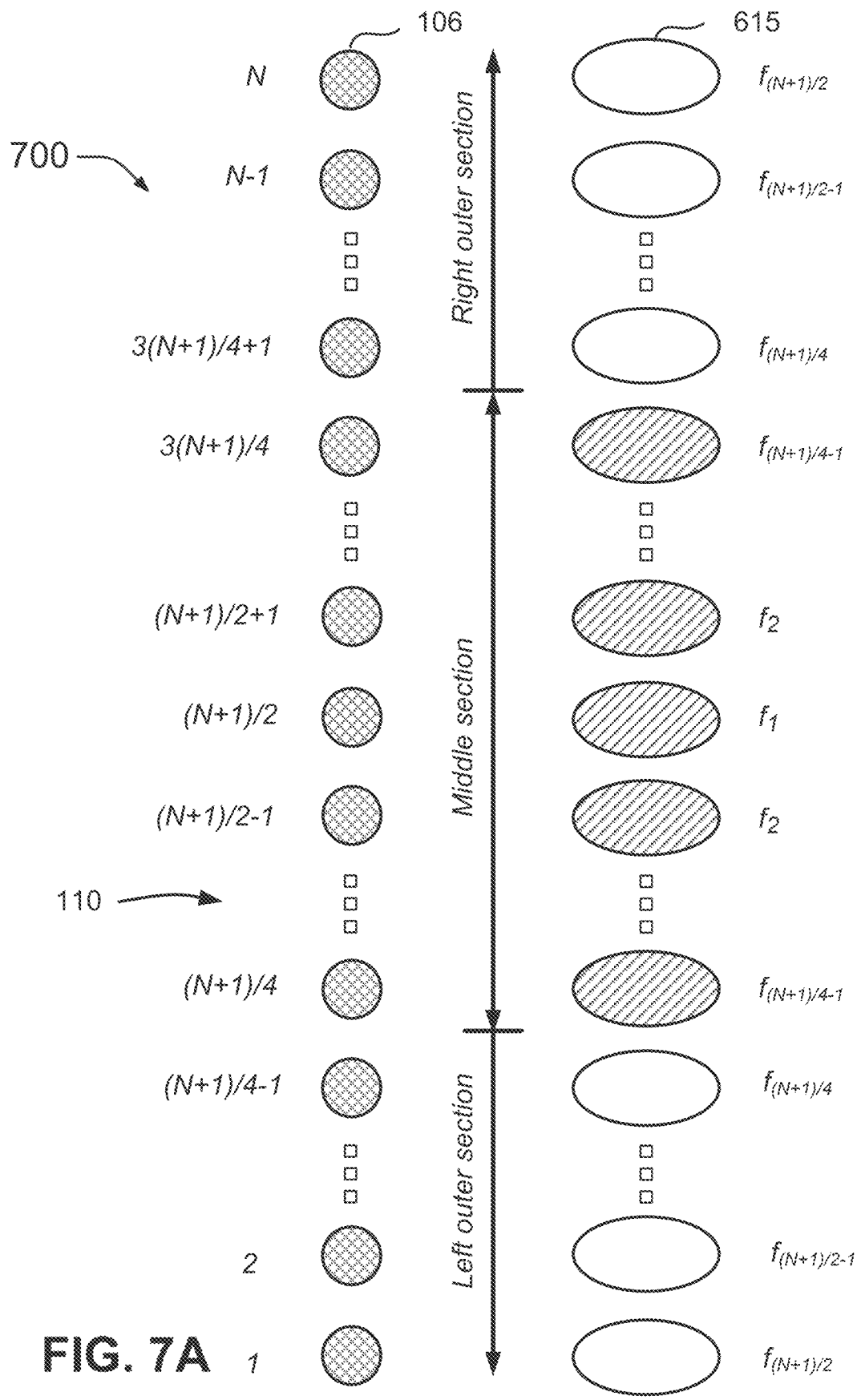
FIGS. 7A and 7B illustrate an example of a technique that uses deflectors for local mode cooling in accordance with aspects of this disclosure.
Figure 7B:
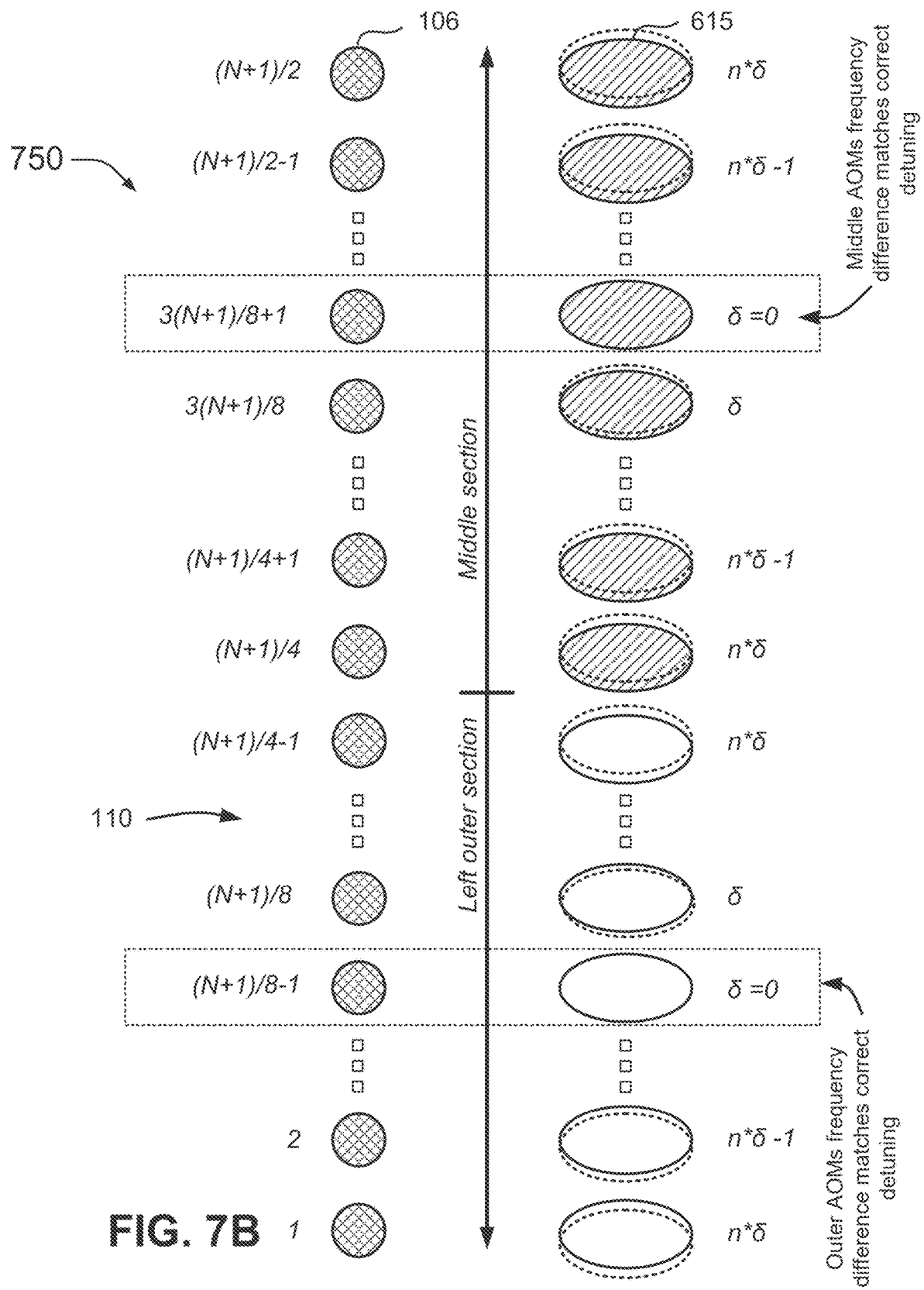

Because the system is symmetric around ion (N+1)/2, a diagram 750 in FIG. 7B zooms in on the left half of the ion chain (i.e., the right half not shown for simplicity). The two upstream AOMs for the diagonally hatched elliptical optical beams of the ions in the middle section are tuned such that the frequency difference matches correct detuning for ion 3(N+1)/8+1. This then sets the detuning of the AODs for ion 3(N+1)/8+1 to $\delta=0$. Similarly, the upstream AOMs of the white elliptical optical beams of the ions in the outer section are set such that the frequency difference matches the correct detuning for ion (N+1)/8. This then sets the detuning of the AODs for ion (N+1)/8 to $\delta=0$.

To match the frequencies required for the rest of the ions in the chain, the AODs are then used to create the proper frequency difference. In the example provided above, this frequency difference is linear in ion number, thus is n*$\delta$, where n is the number of ions away from the $\delta=0$ ion, and $\delta$ is the calculated frequency difference. Because the AOD maps frequency to position, there will be an optical beam offset proportional to n*$\delta$. This offset, which is shown as an overlapping dashed-lined elliptical optical beam, needs to be maintained below the size of the optical beam such that both an optical beam intended for one ion does not get at least partially imaged onto another ion and both optical beams intended for one ion are still imaged onto that ion.

In an implementation of the AOD-based Raman systems the frequency difference may be symmetric about $\delta=0$ and the same for both white elliptical optical beams and dashed-lined elliptical optical beams.

As mentioned above, the AOD-based Raman system described in connection with diagrams 500 and 580 in FIGS. 5A and 5B, respectively, can include 4 AODs and 4 upstream AOMs to generate two pairs of counter-propagating Raman optical beams when single tones are applied to the AODs. For this example, the optical beam waist (radius) along the ion chain axis can be 1.5 mm, the AOD FOV is 114 mm, and the AOD bandwidth is 80 MHz. These last 2 numbers mean that the optical beam from the AOD will move by 114/80=1.4 mm/MHz.

Now, if the number of ions in the chain is N=21, then ions N=1 to N=5 are part of the left section, ions N=6 to N=16 are part of the middle section, and ions N=17 to N=21 are part of the right section. In this case, the local mode cooling BW=3 MHz, this means that it needs to span 3 MHz via 11 distinct Raman frequencies, which are each separated by about 300 kHz. The upstream AOMs for the pair of AODs that provide the diagonally hatched elliptical optical beams for the ions in the middle section can be chosen such that the resulting optical beams that hit ions N=8 and N=14 dead-on have Raman frequency detuning 0.75 MHz (detuning=0 corresponds to on-resonance with lowest-frequency radial mode). This Raman pair will address ions N=6 to N=16 with detunings ranging from 0-1.5 MHz.

The upstream AOMs for the pair of AODs that provide the white elliptical optical beams for the ions in the left and right sections can be chosen such that the resulting beams that hit ions N=3 and N=19 dead-on have Raman frequency detuning 2.25 MHz. This Raman pair will address ions N=1 to N=5 and N=17 to N=21 with detunings ranging from 1.5-3 MHz.

The additional tones that need to be added to each AOD that are shifted from the other two by +(−) 150 kHz, where the +/− sign should be opposite for the two optical beams of the same Raman pair (to give a net 300 kHz shift).

Looking at the effects on the first pair of Raman optical beams (the analysis would be the same for the other Raman pair) in the example above, it requires 11 tones to be sent to each AOD, but only six distinct Raman detunings result which must cover the range from 0-1.5 MHz. If the sensitivity of the AOD is 1.4 mm/MHz, then the misalignment can be n×210 nm and the absolute misalignment of the Raman optical beam pairs for the six distinct Raman detunings are 0.42, 0.21, 0, 0.21, 0.42, 0.63 mm. For an optical beam waist of 1.5 mm in such systems, the optical beam waist is greater than the biggest misalignment and satisfies the requirement. The biggest misalignment is 0.63 mm (or 630 nm) which is just a fraction of a (1.5 mm) optical beam waist and the power at the ion (and thus the Rabi frequency) would be reduced only by −30% at worst. Tweaks to this general scheme are possible to, say, hit different ions dead on if those turn out to help cool modes of particular interest more efficiently.

Figure 8:
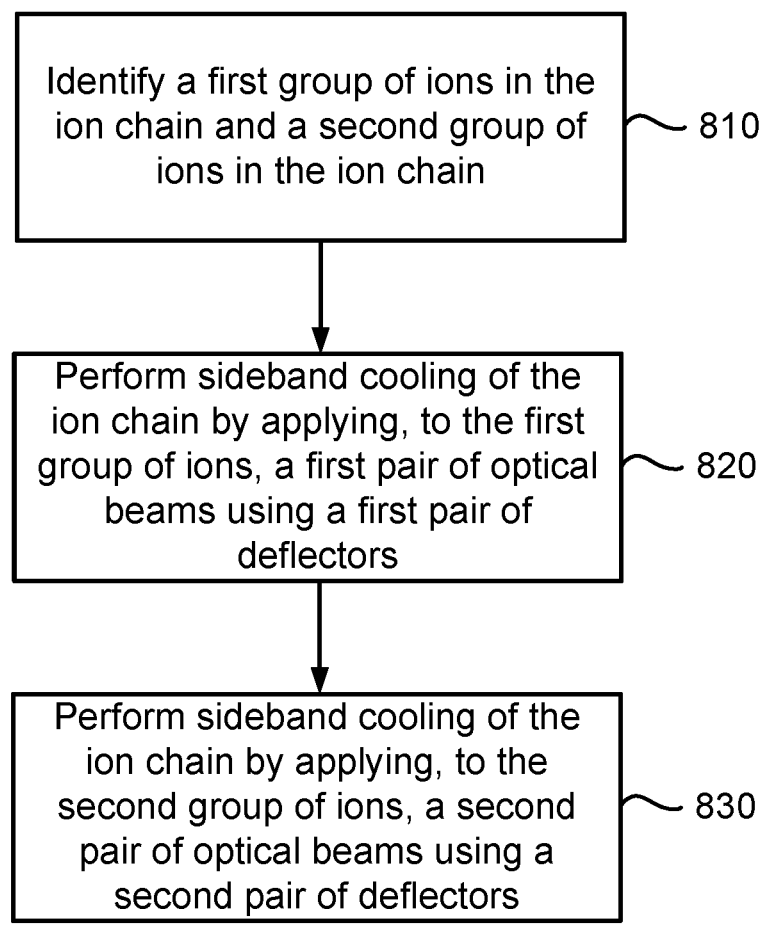
FIG. 8 illustrates an example of a method that uses deflectors for sideband cooling operations in accordance with aspects of this disclosure.

FIG. 8 illustrates an example of a method 800 that uses deflectors (e.g., AODs) for sideband cooling operations. At 810, the method 800 includes identifying a first group of ions in the ion chain and a second group of ions in the ion chain, wherein the ions in the first group of ions are different from the ions in the second group of ions.

At 820, the method 800 includes performing sideband cooling of the ion chain by applying, to the first group of ions, a first pair of optical beams using a first pair of deflectors.

At 830, the method 800 includes, as part of performing the sideband cooling of the ion chain, applying, to the second group of ions, a second pair of optical beams using a second pair of deflectors.

In an aspect of the method 800, the first pair of deflectors includes a pair of AODs and the second pair of deflectors includes a second pair of AODs.

In an aspect of the method 800, the first group of ions includes ions in a middle section of the ion chain and the second group of ions includes ions in two outer sections of the ion chain (see e.g., FIG. 7A). A number of ions in the middle section of the ion chain may include one more ion than a number of ions the two outer sections of the ion chain.

In an aspect of the method 800, wherein applying, to the first group of ions, the first pair of optical beams using the first pair of deflectors includes individually modulating the first pair of optical beams using respective AOMs upstream from the first pair of deflectors (see e.g., FIG. 5B). Individually modulating the first pair of optical beams using respective AOMs comprises matching frequency differences to a correct detuning for a couple of ions in the first group of ions. For all other ions in the first group of ions that are not the couple of ions, the matching of the frequency differences is performed by the first pair of deflectors.

In an aspect of the method 800, wherein applying, to the second group of ions, the second pair of optical beams using the second pair of deflectors includes individually modulating the second pair of optical beams using respective AOMs upstream from the second pair of deflectors (see e.g., FIG. 5B). Individually modulating the second pair of optical beams using respective AOMs comprises matching frequency differences to a correct detuning for a couple of ions in the second group of ions. For all other ions in the second group of ions that are not the couple of ions, the matching of the frequency differences is performed by the second pair of deflectors.

In connection with the method 800, a QIP system configured for sideband cooling of an ion chain may be used (see e.g., FIGS. 5A and 5B). The QIP system includes an ion trap (e.g., ion trap 27) configured to hold the ion chain (e.g., chain 110), ions (e.g., ions 106) in the ion chain being part of a first group of ions or a second group of ions, wherein the ions in the first group of ions are different from the ions in the second group of ions. The QIP system also includes a first pair of deflectors configured to apply a first pair of optical beams to the first group of ions, and a second pair of deflectors configured to apply a second pair of optical beams to the second group of ions. The first pair of deflectors includes a pair of AODs and the second pair of deflectors includes a second pair of AODs (see e.g., AODs 510a-510d in FIGS. 5A and 5B).

In another aspect of the QIP system, the first group of ions includes ions in a middle section of the ion chain and the second group of ions includes ions in two outer sections of the ion chain (see e.g., FIG. 7A). A number of ions in the middle section of the ion chain may the same as a number of ions in the two outer sections of the ion chain.

In another aspect of the QIP system, the QIP system includes a first pair of AOMs configured to individually modulate the first pair of optical beams upstream from the first pair of deflectors (see e.g., FIG. 5B). The first pair of AOMs are further configured to match frequency differences of the first pair of optical beams to a correct detuning for a couple of ions in the first group of ions. For all other ions in the first group of ions that are not the couple of ions, the first pair of deflectors are configured to perform the matching of the frequency differences.

In another aspect of the QIP system, the QIP system includes a second pair of AOMs configured to individually modulate the second pair of optical beams upstream from the second pair of deflectors (see e.g., FIG. 5B). The second pair of AOMs are further configured to match frequency differences of the second pair of optical beams to a correct detuning for a couple of ions in the second group of ions. For all other ions in the second group of ions that are not the couple of ions, the second pair of deflectors are configured to perform the matching of the frequency differences.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for sideband cooling of an ion chain, comprising:
   identifying a first group of ions in the ion chain and a second group of ions in the ion chain, wherein the ions in the first group of ions are different from the ions in the second group of ions; and
   performing sideband cooling of the ion chain by:
      applying, to the first group of ions, a first pair of optical beams using a first pair of deflectors by individually modulating the first pair of optical beams using respective acousto-optic modulators (AOMs) upstream from the first pair of deflectors, and
      applying, to the second group of ions, a second pair of optical beams using a second pair of deflectors.

2. The method of claim 1, wherein the first pair of deflectors includes a pair of acousto-optic deflectors (AODs) and the second pair of deflectors includes a second pair of AODs.

3. The method of claim 1, wherein the first group of ions includes ions in a middle section of the ion chain and the second group of ions includes ions in two outer sections of the ion chain.

4. The method of claim 3, wherein a number of ions in the middle section of the ion chain includes one more ion than a number of ions in the two outer sections of the ion chain.

5. The method of claim 1, wherein individually modulating the first pair of optical beams using respective AOMs comprises matching frequency differences to a correct detuning for a couple of ions in the first group of ions.

6. The method of claim 5, wherein for all other ions in the first group of ions that are not the couple of ions, the matching of the frequency differences is performed by the first pair of deflectors.

7. The method of claim 1, wherein applying, to the second group of ions, the second pair of optical beams using the second pair of deflectors comprises individually modulating the second pair of optical beams using respective AOMs upstream from the second pair of deflectors.

8. The method of claim 7, wherein the individually modulating the second pair of optical beams using respective AOMs comprises matching frequency differences to a correct detuning for a couple of ions in the second group of ions.

9. The method of claim 8, wherein for all other ions in the second group of ions that are not the couple of ions, the matching of the frequency differences is performed by the second pair of deflectors.

10. A quantum information processing (QIP) system configured for sideband cooling of an ion chain, comprising:
an ion trap configured to hold the ion chain, with ions in the ion chain being part of a first group of ions or a second group of ions, wherein the ions in the first group of ions are different from the ions in the second group of ions;
a first pair of deflectors configured to apply a first pair of optical beams to the first group of ions;
a first pair of acousto-optic modulators (AOMs) configured to individually modulate the first pair of optical beams upstream from the first pair of deflectors; and
a second pair of deflectors configured to apply a second pair of optical beams to the second group of ions.

11. The QIP system of claim 10, wherein the first pair of deflectors includes a pair of acousto-optic deflectors (AODs) and the second pair of deflectors includes a second pair of AODs.

12. The QIP system of claim 10, wherein the first group of ions includes ions in a middle section of the ion chain and the second group of ions includes ions in two outer sections of the ion chain.

13. The QIP system of claim 12, wherein a number of ions in the middle section of the ion chain includes one more ion than a number of ions in the two outer sections of the ion chain.

14. The QIP system of claim 10, wherein the first pair of AOMs are further configured to match frequency differences of the first pair of optical beams to a correct detuning for a couple of ions in the first group of ions.

15. The QIP system of claim 14, wherein for all other ions in the first group of ions that are not the couple of ions, the first pair of deflectors are configured to perform the matching of the frequency differences.

16. The QIP system of claim 10, further comprising a second pair of AOMs configured to individually modulate the second pair of optical beams upstream from the second pair of deflectors.

17. The QIP system of claim 16, wherein the second pair of AOMs are further configured to match frequency differences of the second pair of optical beams to a correct detuning for a couple of ions in the second group of ions.

18. The QIP system of claim 17, wherein for all other ions in the second group of ions that are not the couple of ions, the second pair of deflectors are configured to perform the matching of the frequency differences.

* * * * *